United States Patent [19]

Ohta et al.

[11] Patent Number: 4,759,123
[45] Date of Patent: Jul. 26, 1988

[54] METHOD AND APPARATUS FOR PRODUCING ELECTRONIC DEVICES WHICH EACH INCLUDE A MEMORY

[75] Inventors: Masuaki Ohta, Chiba; Yoji Ishikawa, Saitama; Haruki Shinoda, Tokyo, all of Japan

[73] Assignee: Sony Corporation, Tokyo, Japan

[21] Appl. No.: 865,001

[22] Filed: May 20, 1986

[30] Foreign Application Priority Data

May 27, 1985 [JP] Japan ................ 60-113791

[51] Int. Cl.⁴ ............ H05K 3/30; B23P 23/00
[52] U.S. Cl. .................... 29/832; 29/564.1; 209/573; 357/85; 364/468; 364/491
[58] Field of Search ............ 29/832, 564, 564.1; 209/573; 357/85; 364/468, 488, 491

[56] References Cited

U.S. PATENT DOCUMENTS 4,348,276  9/1982  Tateishi et al. .............. 209/573

OTHER PUBLICATIONS

IBM Technical Disclosure Bulletin, vol. 22, No. 5, Oct. 1979, pp. 1979–1980 by C. J. Kugler et al.

Primary Examiner—P. W. Echols
Assistant Examiner—Carl J. Arbes
Attorney, Agent, or Firm—Lewis H. Eslinger; Donald S. Dowden

[57] ABSTRACT

In a production system for performing predetermined processes on products which each have a memory incorporated therein, information necessary for those processes is sequentially written by an external computer in the memory incorporated in each product, and such information is read out from the memory and used by the production system to carry out the respective processes on the products in a low cost and efficient way.

11 Claims, 6 Drawing Sheets

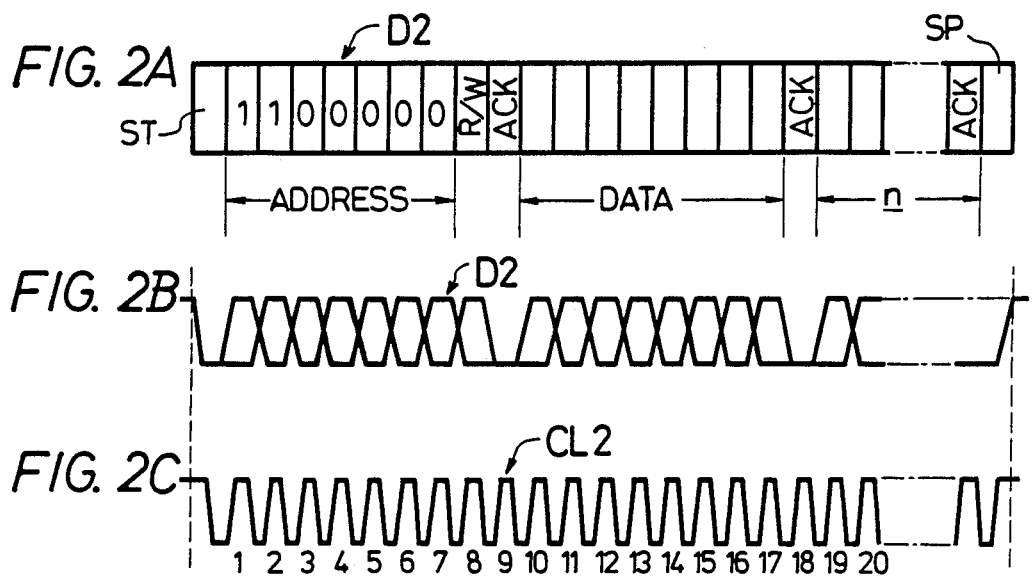
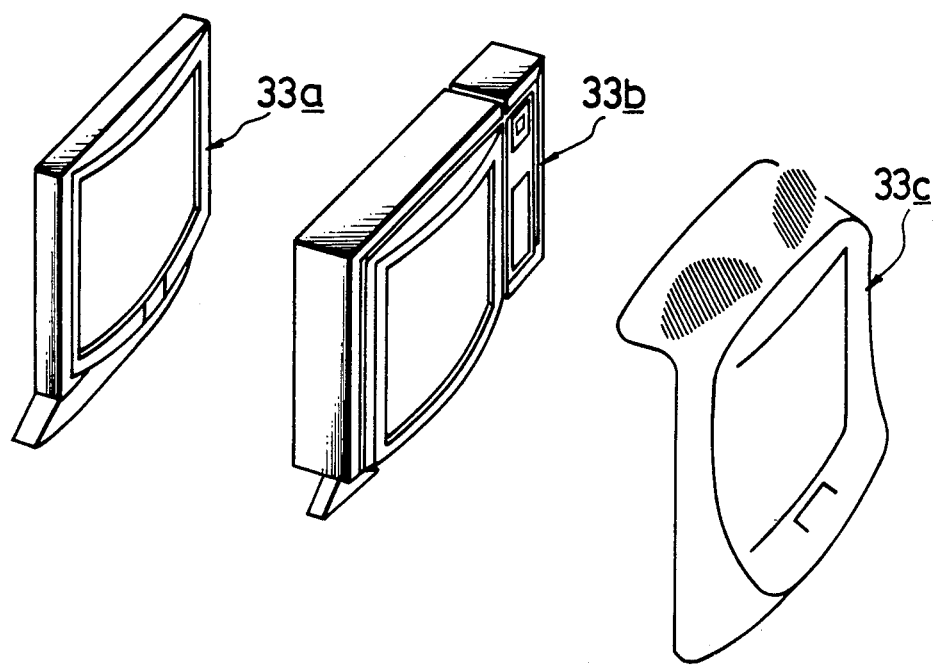

METHOD AND APPARATUS FOR PRODUCING ELECTRONIC DEVICES WHICH EACH INCLUDE A MEMORY

BACKGROUND OF THE INVENTION

1. Field of the Invention

This invention relates generally to production systems, and more particularly is directed to a production system suitable for use in producing an electronic product or device which can be controlled through an inner bus by an external computer or the like.

2. Description of the Prior Art

A production system has recently been proposed in which the production process is controlled by a computer in a concentrated or integrated control fashion. As a typical and well known example of such a production system, there is the so-called "just-in-time" inventory system developed in Japan and there referred to as the "Kanban" production system. According to this "just-in-time" inventory system, each product being conveyed along the production line bears a so-called kanban (sign board) in which work instructions or information and the like are written and, on the basis of such work instructions or information written in the sign board associated with each product, the assembly, adjusting and other necessary work are carried out by robots or manually.

In the field of electronic devices, such as, television receivers, VTRs (video tape recorders), audio tape recorders and so on, digital circuits are widely used. Most of these digitized devices employ an inner bus system. In such inner bus system, a CPU (central processing unit), an inner bus, a ROM (read-only memory) and so on are incorporated in the device, and predetermined or set values for operation of each circuit are stored in this ROM. Upon normal operation, the foregoing set values are read from the ROM by the CPU, and the data read out are supplied through the inner bus to a predetermined circuit, whereby such circuit is driven to carry out a predetermined operation. At the same time, each circuit is controlled through the CPU by an external instrumentality, such as, a keyboard, a remote controller and the like. The inner bus used in such inner bus system is usually a two-wire system bus or a three-wire system bus. The two-wire system bus is formed of a data transmission line and a clock transmission line, and may utilize a communication system such as is disclosed in published Japanese patent application unexamined No. 106262/1982. The three-wire system bus is formed of a data transmission line, a clock transmission line and a transmission line for an identifying signal which is used to identify a data block.

In the case of electronic devices equipped with the above mentioned inner bus system, the adjustment thereof during manufacturing and in use can be standardized, made common and simplified so that reduction of the manufacturing and other costs can be expected.

It is to be noted that, in the case of the prior art production systems, such as, the "just-in-time" inventory system, the indication of the work instructions or information and the like, impose a heavy load on a host computer. Further, since several manufacturing processes must be carried out simultaneously, the prior art production system requires a high-speed and large-sized computer.

OBJECTS AND SUMMARY OF THE INVENTION

Accordingly, it is an object of this invention to provide an improved method and apparatus for producing electronic devices or products which each include a memory.

Another object of this invention is to provide an improved method and apparatus for producing electronic devices which each include a memory storing instructions or information to be read so that each production process can be carried out with high efficiency.

A further object of this invention is to provide a production system capable of reducing the cost of manufacture, and in which the production process can be controlled by a computer processing information stored in a memory of each product being made.

According to one aspect of the present invention, there is provided a production system for performing a plurality of processes on electronic products each of which has at least a memory, the system comprising: means for initially writing in each said memory information which is necessary for said processes; and means for reading from said memory said information at the beginning of each of said processes for contributing to the control of the latter.

The above, and other objects, features and advantages of the present invention, will become apparent from the following detailed description of a preferred embodiment to be read in conjunction with the accompanying drawings, and throughout which like reference numerals designate like elements and parts.

BRIEF DESCRIPTION OF THE DRAWINGS

FIGS. 2A, 2B and 2C are diagrammatical representations of the format of signals which are transmitted through a two-wire system bus line;

FIG. 6 is a perspective view of several different types of front frames or bezels for a television receiver.

DESCRIPTION OF THE PREFERRED EMBODIMENT

An embodiment of a production system according to this invention will be described in detail as applied to the manufacture of a television receiver which incorporates an inner bus system shown on FIGS. 1 and 2.

Figure 1:
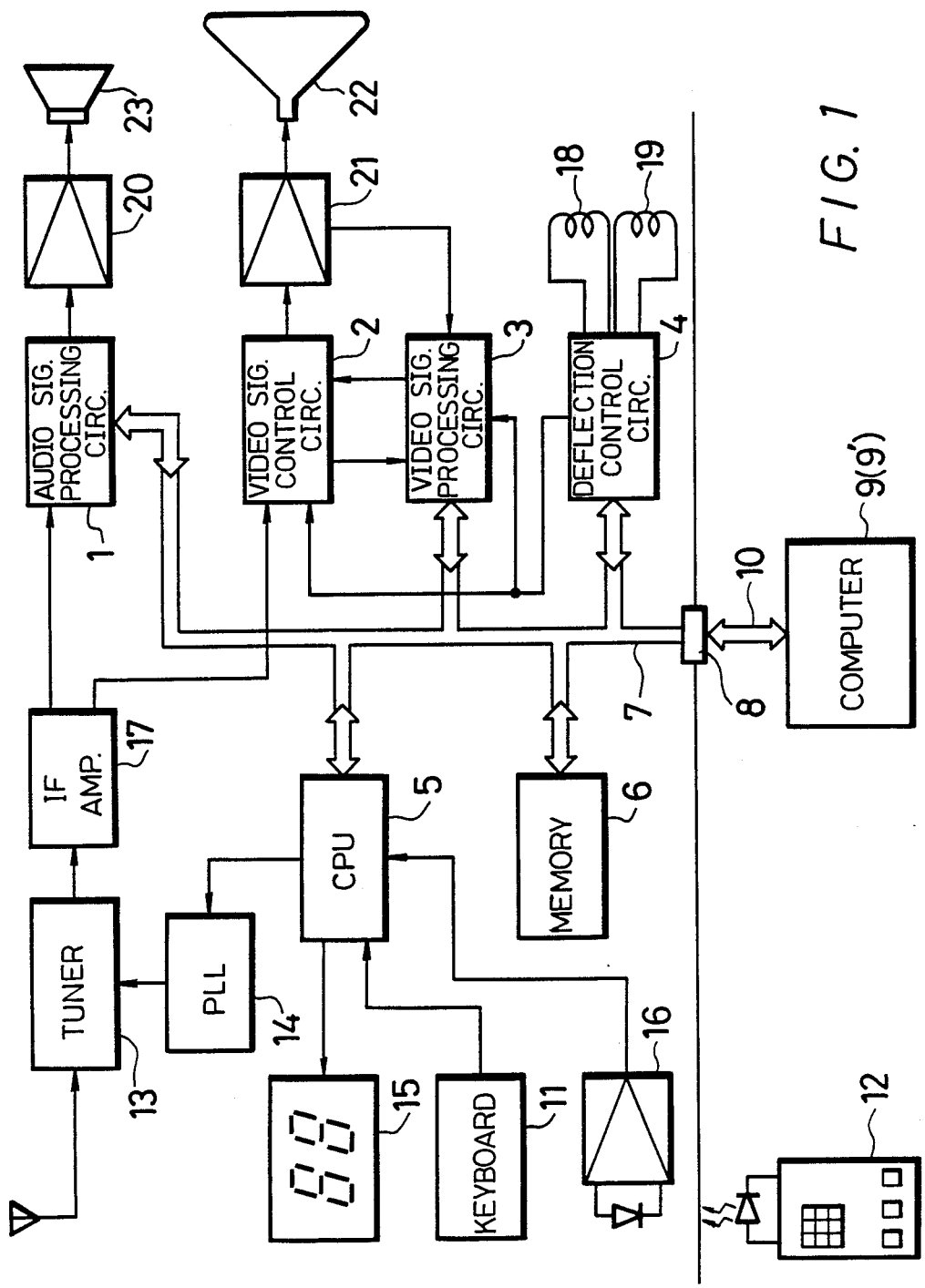
FIG. 1 is a block diagram showing a television receiver to which a production system according to an embodiment of the invention can be applied.

Within the television receiver, there are located an IC (integrated circuit) arrangement of an audio signal processing circuit 1, a video signal control circuit 2, a video signal processing circuit 3 and a deflection control circuit 4 (FIG. 1). A CPU 5 and a memory 6 are also shown to be provided within the television receiver. As the memory 6, there is used, for example, a non-volatile memory. These circuit elements 1 to 6 are connected with one another through a bus line 7. The bus line 7 is connected to a connector 8 which is provided on the television receiver. At this connector 8, there is separably connected a computer 9 by way of an external bus line 10. A display section (not shown), such as, a monitor receiver and the like, is suitably connected to the computer 9.

In normal operation, in accordance with an instruction issued from a keyboard 11 or a commander 12 for remote control operation, the CPU 5 suitably controls the circuits 1 to 4, and a PLL (phase locked loop) circuit 14 by which a tuner 13 is tuned and so on. Accordingly, the channel selection, the adjustment of sound volume, the adjustment of picture and so on are carried out, and the results are indicated on an indication section 15. In FIG. 1, reference numeral 16 designates a remote control signal receiving circuit which receives the remote control signal from commander 12 and supplies it to the CPU 5. Reference numeral 17 designates an intermediate frequency (IF) amplifying circuit which receives a signal from tuner 13 and converts it to an intermediate frequency signal which is supplied to audio signal processing circuit 1 and video signal control circuit 2. Reference numerals 18 and 19 respectively designate horizontal and vertical deflection coils which are connected to deflection control circuit 4 to carry out the horizontal and vertical deflections of an electron beam or beams in an associated cathode ray tube (CRT) 22. Reference numeral 20 designates an audio output amplifier which supplies an audio signal from processing circuit to a loudspeaker 23. A video output amplifier 21 supplies a video signal from circuit 2 to CRT 22.

When adjustments are to be effected during the manufacturing process and during servicing of the television receiver, the computer 9 or the adjustment commander 12 is used and the following operation is carried out.

When the adjustment is to be effected during the manufacturing process, suitable digital data corresponding to an adjusted value or values are generated by operating the keyboard of computer 9. Such digital data are supplied through bus line 10, connector 8 and bus line 7 to the respective circuits 1 to 4.

In each of the circuits 1 to 4, the digital data supplied thereto is latched through a bus interface (not shown) and converted to an analog control signal by a D/A (digital-to-analog) converting circuit (not shown). The circuits 1 to 4 are suitably controlled by the respective control signals and the output signals from the circuits 1 to 4, respectively, are changed in response to these control operations. Each of these controlled or changed output signals is converted to digital signals by an A/D (analog-to-digital) converting circuit (not shown) in the respective one of the circuits 1 to 4, and the resulting digital signals or data are returned through the bus interface and bus lines 7 and 10 to computer 9. On the basis of these returned digital signals, the indication section of the computer 9 indicates the results of the adjustments of circuits 1 to 4.

After it is confirmed from the indication of the adjusted results that the proper adjustments have been carried out in response to operation of the keyboard of computer 9, the adjusted values acting in circuits 1 to 4 at that time are stored in memory 6 as predetermined or reference values.

Upon normal operation of the television receiver, the data representing the predetermined or reference values set as indicated above and stored in memory 6 are read out by CPU 5, and circuits 1 to 4 carry out respective predetermined operations with these data used as the operation standards or reference values.

When servicing or trouble-shooting the television receiver to find out the source of the trouble or malfunction, a computer 9' for rendering such service is connected to the television receiver through bus line 10. The computer 9' used for servicing the television receiver may be the same as or similar to that used in the manufacturing operation. By operating the keyboard of computer 9', an address of a selected one of the circuits 1 to 4, respectively, is specified and thereby a circuit is selected to be examined for trouble. Subsequently, instructions are issued through bus lines 10 and 7 in order that the data indicative of the operating state of the selected circuit is supplied to computer 9'. In the selected circuit, the level of the signal corresponding to the operation state being examined is converted to digital data by the A/D converting circuit (not shown) of that circuit 1 to 4. The resulting digital data is supplied through bus lines 7 and 10 to computer 9' in which there has been previously stored the various reference values for circuits 1 to 4 when the television receiver is in a correct operation state. The stored reference values are compared with the signal levels transmitted from the selected circuit and thereby the state of the selected circuit is examined. The result of such examination is indicated on the indication section of the computer 9'. It will be apparent that, by systematically carrying out the above-mentioned operations on the various circuits in like manner, it is possible to locate the troubled or defective circuit.

Among the operating parameters suitable for control or adjustment in the manner described above, there are those relating to electron beam deflections, such as, the widths of rasters in the horizontal and vertical directions, linearity, pin cushion distortion and the like, those relating to color adjustment, such as, the cut-off voltages of the R,G and B signals, the white balance adjustment and the like, and those relating to the grid bias adjustment of the CRT and so on.

Alternatively, it is possible to provide a system in which data obtained in the adjustment operation during servicing of each television receiver are recorded on a memory, record medium and the like, or are transmitted through a telephone network line to a central integrated control computer which suitably processes such data. With such system, the central integrated control computer can provide service history printouts on the basis of data transmitted from several service stations and transmit them to a designing, development or a research section, so that the service history can guide future developments of the product.

Referring now to FIGS. 2A, 2B and 2C, it will be seen that, in a two-wire system bus line, a first transmission line transmits therethrough serial data D2 shown in FIG. 2B, while a second transmission line transmits therethrough a clock CL2 shown in FIG. 2C. As shown in FIG. 2A, serial data D2 is formed of a start signal ST of one bit, an address signal of 7 bits for specifying the address assigned to a respective one of the controlled circuits 1 to 4 (FIG. 1), a read or write signal R/W of one bit for determining whether the data is to be supplied to the addressed controlled circuit or is to be read out from the addressed controlled circuit, an acknowledge signal ACK of one bit for confirming that the circuit to be controlled is addressed and is conditioned to either write the data that follows or to read data and supply the latter to the computer 9 or 9′, data of 8 bits indicative of an adjustment level or reference value and the like, n data each of which is formed of 9 bits and used for other necessary operations and a stop signal SP of one bit.

Having described how the television receiver using an inner bus system with a memory can be controlled by the external computer and so on from the outside, a production system embodying this invention will now be described for producing such television receiver.

Figure 3:
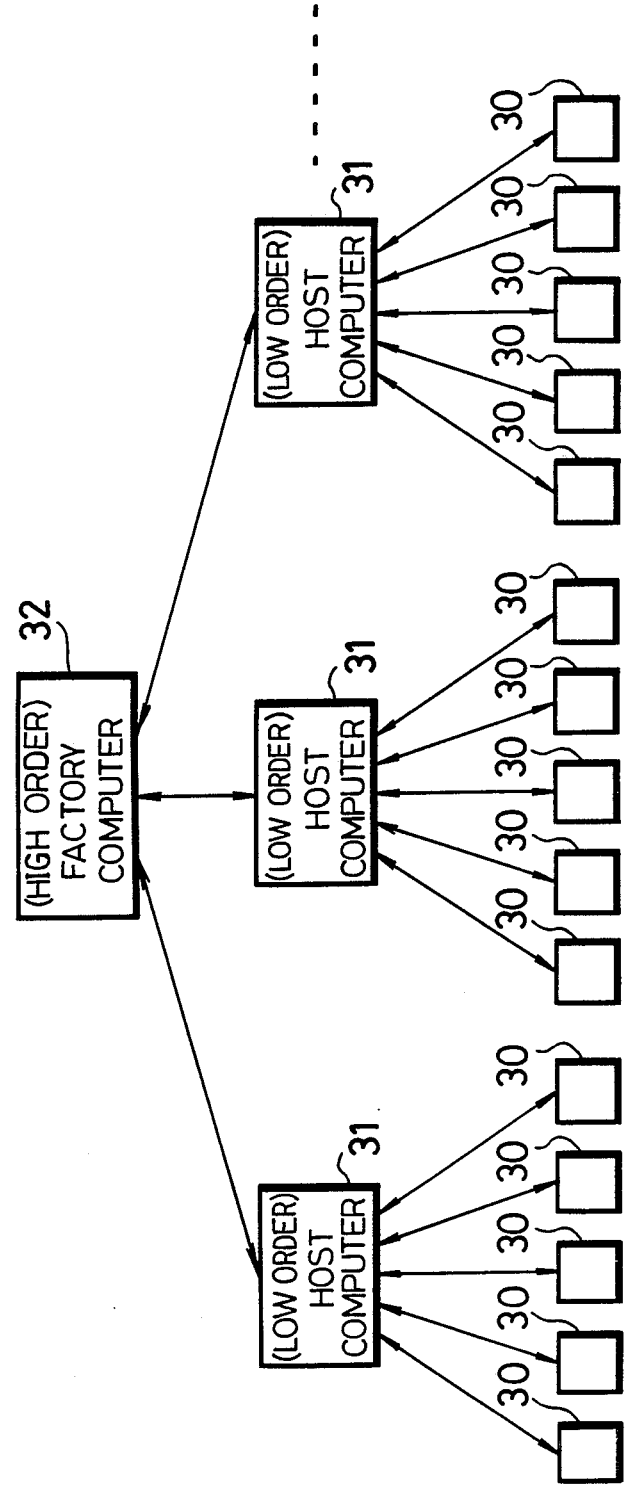
FIG. 3 is a schematic block diagram showing the overall arrangement of a production system according to an embodiment of this invention.

FIG. 3 shows an overall arrangement of a production system according to an embodiment of the present invention, and in which a plurality of the television receivers, indicated schematically at 30, are mounted on process or assembly lines. In order to supervise or control the production of these television receivers 30, low order computers (host computers) 31 equivalent to the above-mentioned computer 9 (FIG. 1) are provided at the respective process lines. Further, these low order computers 31 are controlled, in turn, by a single high order or factory wide computer 32.

The low order computers 31 are used to write or store in the memory 6 (FIG. 1) of each television receiver 30 on the respective process or assembly line, information necessary for the respective production process, and then to read such information from each memory 6 at a predetermined time as will be described later. For example, in response to the stored information read from the memory 6 of each receiver, instructions are issued by the respective computer 31 to withdraw particular types of CRTs, printed circuit boards and the like from a warehouse or magazine in a predetermined sequential order and to place them on conveyors or unmanned cars directed to appropriate destinations, and it is checked whether or not the described operations are carried out correctly. Further, each computer 31 checks whether or not the respective production line is moving at a predetermined speed without interruption or error. A series of these operations can be controlled by the high order computer 32 directly or through the low order computers 31. The high order computer 32 gives instructions on production planning, material information and designing information to the low order computers 31, collects control information or feedback from the several production lines and stores the same on a disc or the like.

Figure 4:
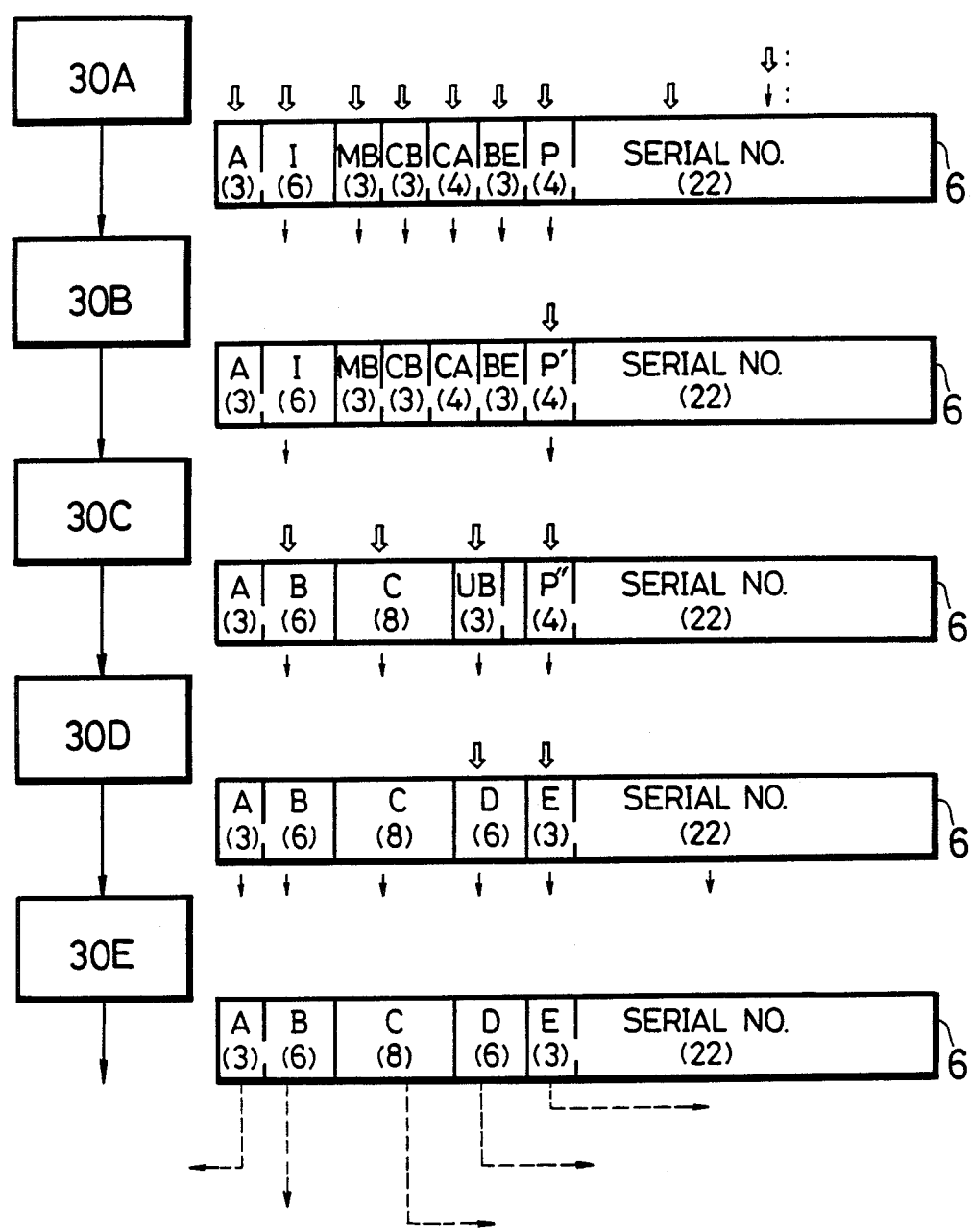
FIG. 4 is a schematic diagram used to explain respective manufacturing processes of the production system embodying this invention.

FIG. 4 shows an example of the flow of successive manufacturing processes performed on each television receiver 30 and the changing state of the information or data written in, or read out from the memory 6, in accordance therewith. In this case, for example, it is assumed that the successive manufacturing processes are adjustment of the printed circuit boards, assembly of the other components of the receiver, adjustment of the completed receiver, inspection, and packing and servicing.

At completion of the stage or process where adjustment of the printed circuit board is effected, information signals A,I,MB,CB, CA,BE,P and SERIAL NO. are written in predetermined areas of the memory 6 of the respective receiver 30A (FIG. 4) by the low order computer 31 (FIG. 3) associated with the respective production line. In this case, signal A designates the type or category of the product being made, signal I identifies the assembly of the CRT, the deflection yoke and the like, MB identifies the user control board, CB identifies the accessory board, CA identifies the cabinet, and BE identifies the bezel which are required for completion of the product A, and P identifies the next process to be performed. The parenthesized numerals on FIG. 4 designate the numbers of bits used for each signal which are, of course, only given by way of example.

Of the information signals written in memory 6, the information signals utilized in the next assembly process are read by the low order computer 31. At this stage, each of the signals I, MB, CB, CA, BE and P is read out by way of example. The low order computer 31, based on the read out signal P, instructs robots or the like, at a corresponding place or station along the assembly line, to start the assembly work associated with such process P. Further, in response to the read out of signal P, computer 31 directs an unmanned car, if the car is used as carrying means, to the respective destination or station or, if a conveyor system is used, instructs the system to convey the necessary elements to such station. In response to signal I, the arrival of elements to be assembled, such as the CRT, the deflection yoke and the like, at the indicated destination or station, is checked. If such elements are the correct ones, they are assembled by a robot or manually. Similarly, suitable operations are carried out in response to read out of signals MB, CB, CA and BE, as indicated below.

Figure 5:
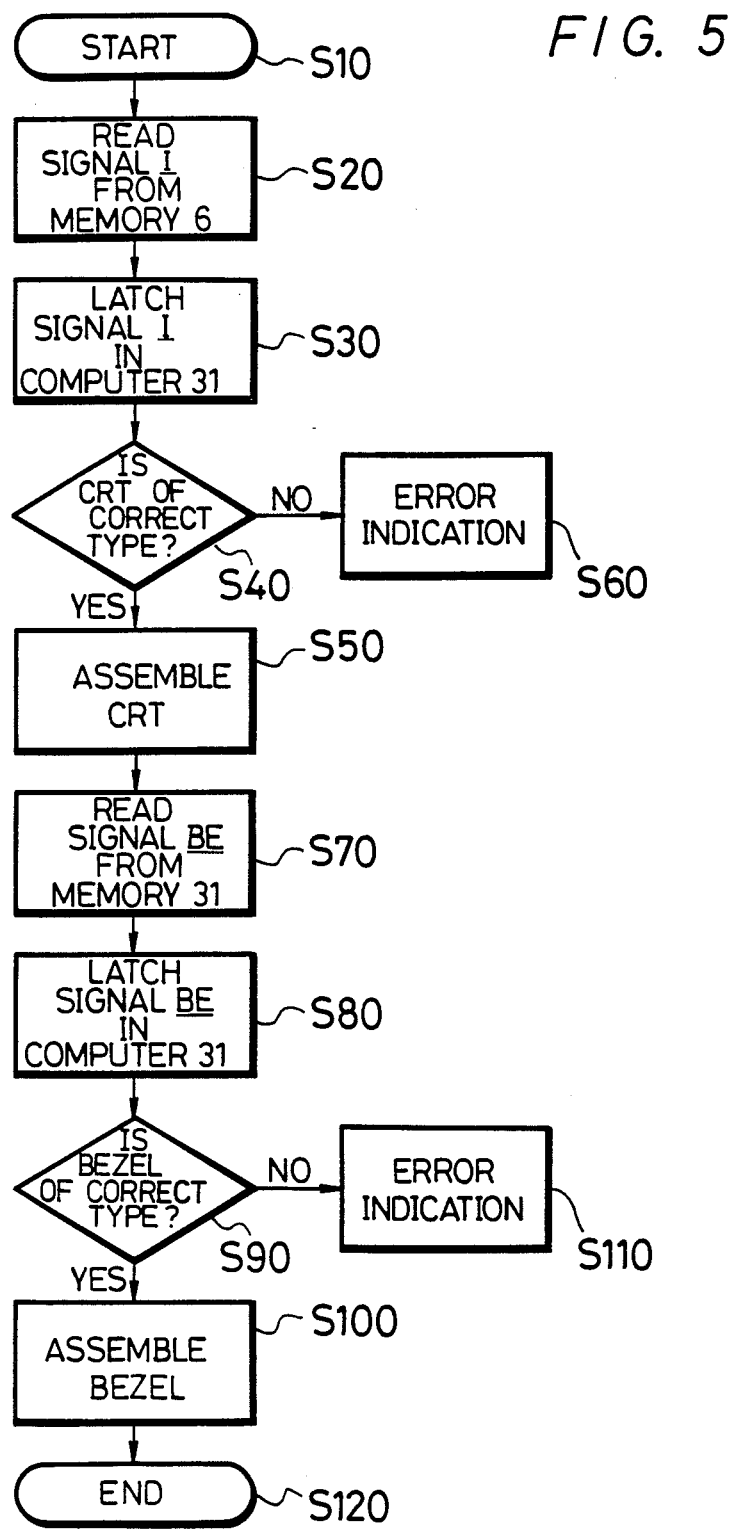
FIG. 5 is a flow chart showing steps in a program for an assembling process included in the system of FIG. 4.

More particularly, a description will now be given, with reference to the flow chart of FIG. 5, of the process or program by which the CRT and the bezel are assembled. Such program is shown to start at step S10. At step S20, the signal I is read out from memory 6 by the low order computer 31 and at step S30, it is latched in the low order computer 31. Then, at step S40, it is determined whether or not the arrived CRT is of the correct type. If the CRT is of correct type, it is assembled with the respective deflection yokes and the like by a robot or manually at step S50. On the other hand, if the CRT is not correct, the program goes to a step S60 in which an error indication is provided.

Subsequently, at step S70, the signal BE identifying the correct one of the types of bezels 33a, 33b and 33c shown on FIG. 6 is read out from memory 6 by the low order computer 31 and at step S80, signal BE is latched in the low order computer 31. Then, at step S90, it is checked whether or not the correct type of bezel has arrived at the assembly station. If the bezel is correct, it is assembled by the robot or manually at step S100. If, on the other hand, the delivered bezel is not correct, an error indication is provided in step S110. The program of the series of assembly processes ends at step S120. Of course, similar assembly processes are performed in response to read out of signals MB, CB, and CA.

After such assembly processes are ended, a signal P′ indicative of the next process, for example, an adjustment process, is written by computer 31 in the memory 6 of the respective receiver 30B on FIG. 4. Such signal P′ indicating an adjustment process is then read out of memory 6 by the low order computer 31, which then effects the start of the adjustment process or instructs the unmanned car to proceed to the destination where the adjustment process will be performed. Then, the signal I is read from memory 6 by the low order computer 31 so as to carry out the adjustments of the CRT, such as, adjustment of the white balance, adjustment of the beam deflection and the like.

After the adjustment processes are completed, instead of the signal I, a signal B′ and, instead of the signals MB, CB, CA and BE, signals C and UB are written in memory 6 by low order computer 31, as indicated at the stage 30C on FIG. 4. The signal B' indicates the test characteristics for the particular kind and size of the CRT, the signal C indicates a feature or features with which the respective television receiver is provided, and the signal UB indicates input and output blocks, respectively, to be attached to the receiver for the testing or inspection thereof. Also, signal P" indicative of the next or testing process is written in the memory 6.

Before commencement of the inspection or testing process, signal P" is read out from memory 6 by computer 31, whereby an instruction is given by the latter to start the inspection, or an instruction is given for directing the unmanned car to the inspection place or station. The signal B' is read out from memory 6 by computer 31, whereby to confirm that the white balance, the cut-off points of the R, G and B signals or the beam deflections and the like conform to the test characteristics indicated by signal B'. Further, the signal C is read out from memory 6 by computer 31 which then confirms that, for example, the remote control operation and the operation of the user control section are correct. Furthermore, the signal UB is read out from memory 6 by computer 31 to select a predetermined input-/output block, from among several input/output blocks, for attachment to the receiver when testing its input/output circuits.

After the inspection process is ended, a signal D and a signal E are written in memory 6 by computer 31 instead of the signal UB and the signal P'", respectively, as indicated at stage 30D on FIG. 4. In this case, signal D designates a place or destination to which the receiver is to be shipped, and signal E designates the color.

When the manufacturing process enters the packing process, the signals A, B', C, D and E and the signal SERIAL NO. are read out from memory 6 by low computer 31 and the packing and shipping is carried out in accordance with the respective items of information.

Thus, the television receiver is delivered with signals A', B', C, D and E and the signal SERIAL NO. written in its memory 6 as indicated at stage 30E on FIG. 4, and these signals represent a kind of name-plate which can be read when servicing the receiver to provide the respective types of information.

Figure 7:
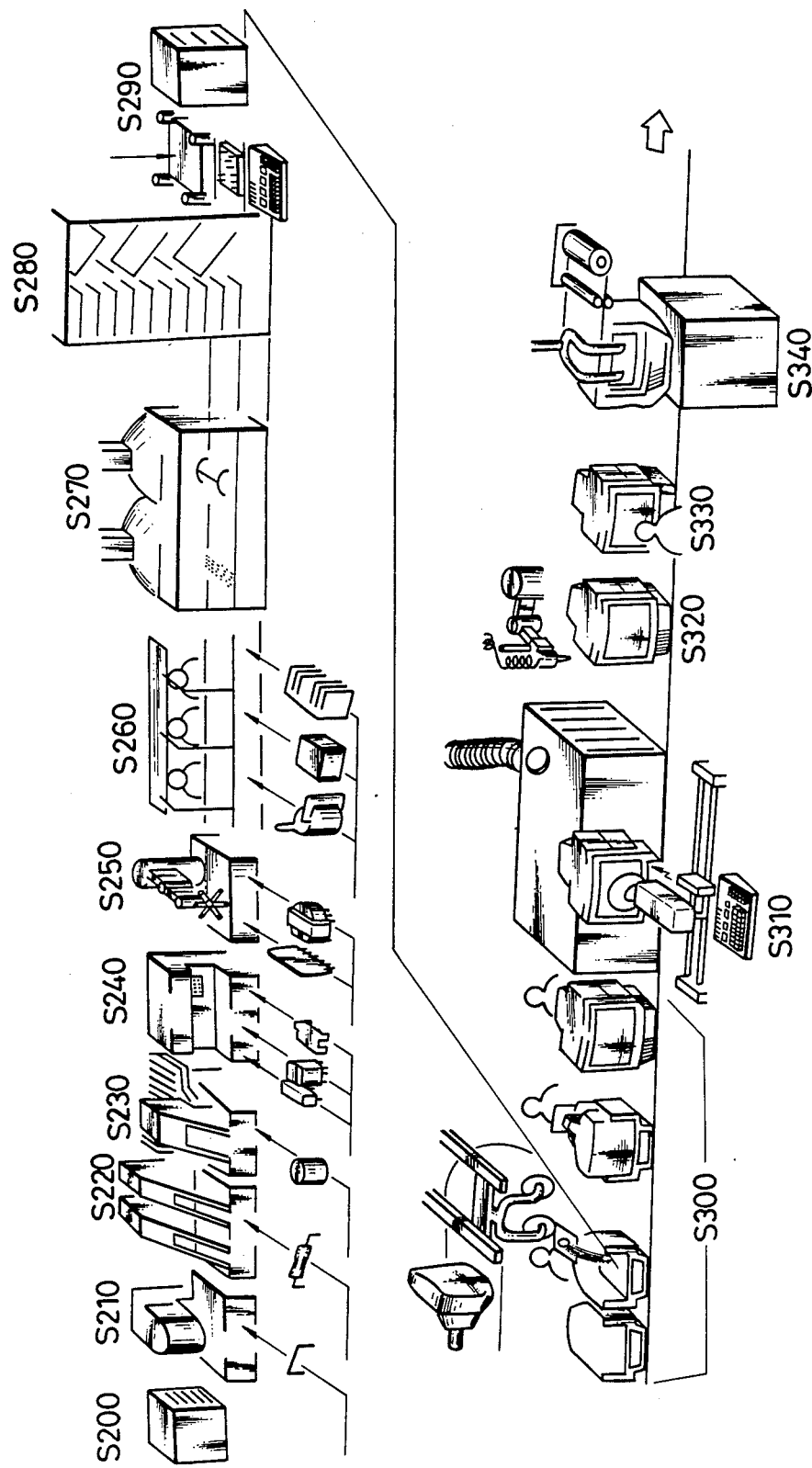
FIG. 7 is a schematic representation showing successive stages in a production system for making television receivers, and to which this invention may be advantageously applied.

FIG. 7 schematically illustrates a sequence of manufacturing processes that may be typically performed on the described television receiver having an inner bus system in a production system according to the present invention.

More particularly, at step S200, a printed circuit board is taken out from a printed circuit board magazine and, at step S210, a jumper is attached to the printed circuit board by a jumper inserting machine. At step S220, a resistor or the like is attached to the printed circuit board by a so-called axial inserting machine. At step S230, a capacitor or the like is attached to the printed circuit board by a so-called radial inserting machine and, at step S240, a micro-inductor, an IFT (intermediate frequency transformer), a VR (variable resistor) and the like are attached to the printed circuit board by a deformed parts inserting machine. At step S250, an IC (integrated circuit), a ceramic filter or output transformer, and the like are attached to the printed circuit board by another deformed parts inserting machine. Further, at step S260, a flyback transformed, a power source unit, a heat sink and the like are manually mounted on the printed circuit board.

The various parts mounted on the printed circuit board, as described above, are soldered by a dip machine at step S270 and, after being subjected to a heat shock test and vibration test at step S280, the board adjustment is carried out at step S290.

The adjusted printed circuit board is assembled into a cabinet together with the CRT and the like, and a bezel is attached, at step S300. Thereafter, at step S310, the television receiver thus assembled is subjected to various adjustments, for example, of the white balance, deflection and the like, and the insulating characteristics of the receiver are checked at step S320. At step S330, the television receiver is connected to the input and output blocks and is subjected to the delivery inspection. Thereafter, at step S340, the television receiver is packed by an automatic casing or packing machine, and then delivered.

Although, in the example shown in FIG. 4, this invention is applied to stages of the production system after the printed circuit board is adjusted, it is possible to similarly apply this invention at any other stage of the production system, for example, the stage in which parts, such as, resistors, capacitors, ICs and the like, are being mounted on the printed circuit board, Further, although, in the above described embodiment, this invention is applied to a television receiver, it is apparent that the invention is not limited to television receivers, but can be similarly applied to other electronic devices, or other products, such as, vehicles, machine tools, robots and so on, which have memories.

According to the present invention as set forth above, since the items of information necessary for the production process are sequentially written in and read out from the memory 6 incorporated in the product or device by the production system control computer 31 to thereby carry out the predetermined production steps, and the contents of the memory are re-written in accordance with changes of the process, the production can be controlled and carried out with high efficiency even by a computer having a relatively small capacity and there is no need for high speed operation of the computer so that computer processing can be carried out at low cost.

In the prior art production system, information unnecessary for a particular process is also written on the sign board (Kanban). However, according to the present invention, only instructions or information necessary for a particular corresponding process is obtained each time it is required so that the unnecessary instructions or information can be excluded.

Further, in the prior production system, a tag, on which the work history and the like are written, is attached to a chassis or the like and moves therewith along the production line. According to this invention, the memory 6 can take the place of such tag so that all necessary data can be carried and made available with ease.

Furthermore, a LAN (local area network) can be easily introduced into the production system according to the invention, and also the product being produced can be easily modified, in accordance with market demand, at any stage of its manufacture.

Although a preferred embodiment of the invention has been described in detail herein with reference to the accompanying drawings, it is apparent that the invention is not limited to that embodiment, and that many modifications and variations could be effected therein by one skilled in the art without departing from the spirit or scope of the invention as defined by the appended claims.

What is claimed is:

1. A production system having means for performing a plurality of subsequent manufacturing processes for completing production of electronic products each of which products already includes at least a memory connected for writing and reading information, the system comprising:

means for writing in said memory of each of said products information necessary for the performance of each of said subsequent manufacturing processes before the start of performance of the respective processes; and means for reading said information from said memory at the beginning of the performance of each of said subsequent manufacturing processes and for performing each of said processes in accordance with said information read from said memory.

2. The production system according to claim 1; further comprising means for controlling said writing means so that at least some of said information is rewritten in said memory at the beginning of each of said processes before said information is read.

3. The production system according to claim 2; in which said means for performing said processes comprise the operative association of means for effecting adjustment of printed circuit boards, means for assembling parts, means for adjusting predetermined characteristics of said electronic products, means for testing said electronic products and means for packaging said electronic products.

4. The production system according to claim 3; in which said information is formed of digital codes.

5. The production system according to claim 4; in which said electronic products are television receivers.

6. The production system according to claim 1; in which said means for writing in, and reading from said memory of each of the electronic products includes computer means operatively associated with said means for performing a plurality of manufacturing processes, said computer means controlling the performance of said processes.

7. A method of controlling a sequence of subsequent manufacturing processes for completing production of electronic products each of which products already includes at least a memory connected for reading and writing information, the method comprising the steps of:

writing in said memory of each of said products information necessary for the performance of each of said subsequent manufacturing processes before the commencement of the respective processes;

reading said information from said memory at the beginning of the performance of the respective subsequent manufacturing processes; and performing the respective processes in accordance with said information read from said memory.

8. The method according to claim 7; further comprising the step of rewriting at least some of said information in said memory at the beginning of each of said processes before said information is read.

9. The method according to claim 8; in which said processes comprise adjusting printed circuit boards, assembling parts, adjusting characteristics of said electronic products, testing said electronic products and packing said electronic products.

10. The method according to claim 9; in which said information is formed of digital codes.

11. The method according to claim 10; in which said electronic products are television receivers.

* * * * *